United States Patent
Brailovskiy et al.

(10) Patent No.: US 9,635,389 B1
(45) Date of Patent: Apr. 25, 2017

(54) BINARY MASK COMPRESSION

(71) Applicant: Amazon Technologies, Inc., Seattle, WA (US)

(72) Inventors: Ilya Vladimirovich Brailovskiy, Mountain View, CA (US); Ilia Vitsnudel, Yehuda (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/953,850

(22) Filed: Nov. 30, 2015

(51) Int. Cl.
| | |
|---|---|
| *G06K 9/46* | (2006.01) |
| *H04N 19/93* | (2014.01) |
| *H04N 19/182* | (2014.01) |
| *H04N 19/176* | (2014.01) |
| *H04N 19/117* | (2014.01) |
| *H04N 19/12* | (2014.01) |
| *H04N 19/186* | (2014.01) |
| *H04N 19/15* | (2014.01) |
| *H04N 19/152* | (2014.01) |

(52) U.S. Cl.
CPC .......... *H04N 19/93* (2014.11); *H04N 19/117* (2014.11); *H04N 19/12* (2014.11); *H04N 19/15* (2014.11); *H04N 19/152* (2014.11); *H04N 19/176* (2014.11); *H04N 19/182* (2014.11); *H04N 19/186* (2014.11)

(58) Field of Classification Search
CPC ...... H04N 19/115; H04N 19/12; H04N 19/15; H04N 19/152; H04N 19/176; H04N 19/186; H04N 19/60; H04N 19/61; H04N 19/91

USPC .................................................. 382/232, 235
See application file for complete search history.

(56) References Cited

U.S. PATENT DOCUMENTS

| | | | | | |
|---|---|---|---|---|---|
| 5,682,152 | A | * | 10/1997 | Wang | H03M 7/46 341/50 |
| 5,959,560 | A | * | 9/1999 | Said | H03M 7/3077 341/107 |
| 7,751,633 | B1 | * | 7/2010 | Mukherjee | H04N 19/176 382/166 |
| 8,442,311 | B1 | * | 5/2013 | Hobbs | G06T 9/00 382/166 |

OTHER PUBLICATIONS

Brailovsky et al, "A New Low-Complexity Entropy Coding Method," International Conference Graphicon, Moscow State University, Moscow, Russia, Available at: http://www.graphicon.ru/html/2004/Proceedings/Technical/s4[3].pdf, 2 pages (2004).

* cited by examiner

*Primary Examiner* — Kanjibhai Patel
(74) *Attorney, Agent, or Firm* — K&L Gates LLP (57) ABSTRACT

Various examples are directed to methods and systems for compressing a binary mask. A computer device may determine that a frequency of a less frequent pixel value state of the binary mask is less than a threshold frequency and may select a block size corresponding to the threshold frequency. The computing device may determine a first run length number of pixel value blocks of the block size that are positioned consecutively in the binary mask sequence and that comprise a first pattern of pixel values and write the first run length number to a first compression sequence.

20 Claims, 9 Drawing Sheets

BINARY MASK COMPRESSION

BACKGROUND

Binary masks are used in image processing for many reasons, including, to identify a particular region or regions in an image.

DETAILED DESCRIPTION

In the following description, reference is made to the accompanying drawings, which illustrate several examples of the present disclosure. It is understood that other examples may be utilized and various operational changes may be made without departing from the spirit and scope of the present disclosure. The following detailed description is not to be taken in a limiting sense, and the scope of the embodiments of the present disclosure is defined only by the claims of the issued patent.

Various examples are directed to systems and methods for compressing binary masks for use in analyzing digital images. A binary mask may comprise a block of pixel values and spatial data describing a two-dimensional spatial arrangement of the pixel values. Each pixel value may be either asserted or not asserted. Depending on the implementation, asserted pixel values may be represented as a logical "1" or as a logical "0." In some examples, a binary mask may correspond to and/or be derived from an image frame captured by a camera or other image sensor. For example, the spatial arrangement of the pixel values of the binary mask may match a spatial arrangement of pixel values of the image frame. An image frame may be a stand-alone image or, in some examples, may be part of a video that includes multiple image frames. The state of pixel values in the binary mask (e.g., asserted or not asserted) may indicate regions of interest in the image frame. For example, an asserted region in a binary mask may indicate that corresponding pixel values in the image frame depict regions of interest, such as objects detected in the image frame. Also, in some examples, asserted pixels may indicate background and/or foreground objects. In some examples, the roles of asserted and not asserted pixels may be reversed. For example, not asserted pixels may indicate regions of interest.

Binary masks, compressed as described herein, may be used in a variety of different contexts. In some examples, binary masks may be utilized to perform action recognition in an image frame or video frame. For example, an image processor system may identify objects in a video frame and develop a binary mask describing the spatial position of the object in the frame. The binary mask may be used to quickly find a depiction of the same object in a subsequent frame. The difference in position between object depictions in the two frames may indicate motion or action. In other examples, binary masks may be used to discriminate foreground and background objects. For example, after an image processor system has determined foreground and background regions in a frame, that information may be encoded as a binary mask. In other examples, a binary mask may be used to indicate regions of a frame that are not of interest. The image processor system may identify regions of a frame that are of interest or not of interest and encode this information in a binary mask. In other examples, a binary mask may be used to merge multiple frames such as, for example, in High Dynamic Range (HDR) applications where a long exposure frame is merged with a short exposure frame. A binary mask may outline one or more objects in the first frame and may be used to align the first frame to one or more other frames. In these and other examples, it may be useful to compress a binary mask, as described herein.

In some examples, binary masks may be stored at a data storage (which may be non-transitory), transmitted from one computing device to another, or otherwise used in a context in which compression is useful. For example, a camera computing device may derive or receive a binary mask corresponding to a captured image frame. Compressing the binary mask may save storage space at the camera computing device. Also, for example, a first computing device may analyze an image frame to identify regions of interest and generate a binary mask corresponding to the image frame. The first computing device may then send the binary mask to a second computing device for further processing (with or without the image frame).

In some examples, a binary mask may be compressed utilizing parameterized run length encoding. A computing device may perform the compression and may receive a one-dimensional binary mask sequence of pixel values. The binary mask sequence of pixel values may be based on the spatial arrangement of pixel values in the binary mask. In some examples, the sequence may be formed by placing successive rows or columns of pixel values from the spatial arrangement one after the other.

In various examples, the computing device compresses the binary mask utilizing blocks of pixel values (referred to herein as pixel value blocks) from the binary mask sequence. Each pixel value block may comprise a predetermined number of pixels that occur consecutively according to the sequence of pixel values. In some examples, the computing device may select the block size considering a frequency of a less frequent state among the pixel values of the binary mask. The less frequent state may be the state that is less common for pixel values in the binary mask and may be asserted or not asserted. For example, the computing device may generally select higher values for the block size when the frequency of the less frequent pixel state (e.g., asserted or not asserted) is lower and lower values for the block size when the frequency of the less frequent pixel state is higher. In some examples, the block size may be selected based on prior knowledge about the binary mask. For example, if the binary mask includes a depiction of a human walking, then the computing device may select a block size that has demonstrated at least acceptable performance on other binary masks also depicting a human walking.

The computing device may identify runs of pixel value blocks that include a first pattern of pixel values. The first pattern of pixel values may be any combination of the block size number of pixel values. In some examples, the first pattern may include blocks in which all pixel values are not asserted. Each run may include a run length number of pixel value blocks with values matching the first pattern (e.g., first pattern pixel value blocks). The computing device may write the run lengths and other pixel value blocks to a compression sequence. Relative to the binary mask sequence, the first compression sequence may replace pixel values blocks having the first pattern with the relevant run length numbers. The computing device may write the remaining pixel value blocks to the compression sequence, for example, in a manner that maintains the order of the remaining pixel value blocks relative to the runs of first pattern pixel value blocks.

In some examples, the computing device may write the run length numbers of the first pattern pixel value blocks to a first compressed sequence and write the remaining pixel value blocks to a second compressed sequence. In the second compressed sequence, the remaining pixel value blocks may be ordered in the same way as the binary mask sequence relative to each other (for example, with the first pattern pixel value blocks omitted). From the second compressed sequence, the computing device may identify runs of pixel values that include a second pattern of pixel values that may also be a second combination of the block size number of pixel values. In some examples, this process may be considered iteratively until the frequency of the less frequent pixel value states is below an end frequency.

Figure 1:
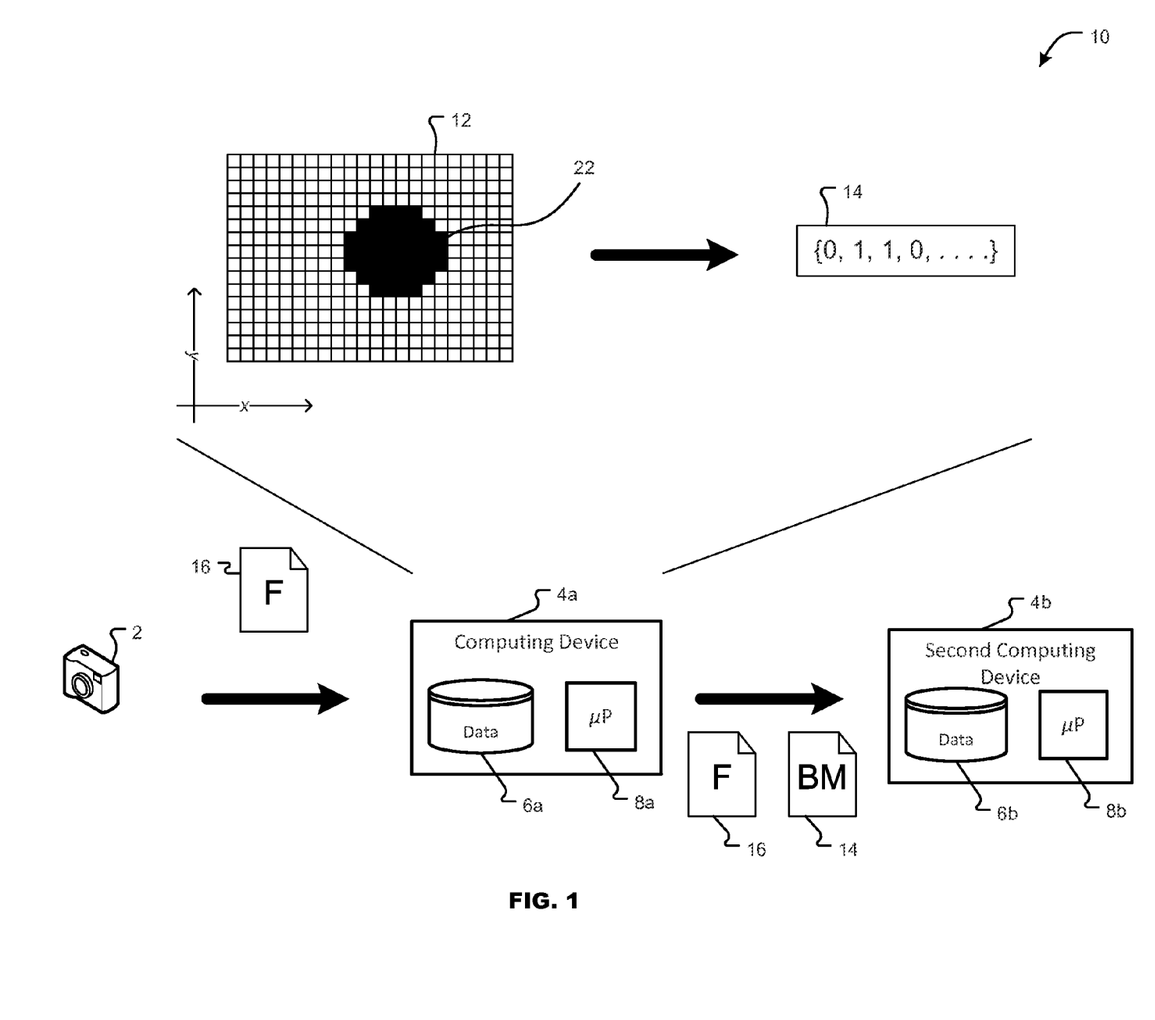
FIG. 1 is a diagram showing one example of an environment for compressing a binary mask.

FIG. 1 is a diagram showing one example of an environment 10 for compressing a binary mask. The environment 10 includes a camera 2 that may capture an image frame 16. The image frame 16 may comprise a plurality of pixel values and spatial data describing a spatial two-dimensional arrangement of the pixel values. The camera 2 may provide the image frame 16 to a first computing device 4a. In some examples, the first computing device 4a may be a component of the camera 2. Alternatively, the camera 2 may provide the image frame 16 to the first computing device 4a using any suitable network or other communication medium. The first computing device 4a may comprise a processor 8a and a non-transitory data storage device 6a in communication with the processor 8a. The data storage device 6a may be or include any suitable type of volatile or non-volatile data storage device including, for example, flash memory, random access memory, disk-based storage, etc. An optional second computing device 4b (described below) may also comprise a processor 8b and data storage device 6b.

The first computing device 4a may generate a binary mask 12 corresponding to the image frame 16. The binary mask 12 may comprise a plurality of pixel values and spatial data describing a spatial arrangement of the pixel values. For example, in FIG. 1, pixel values of the binary mask 12 are arranged according to a two-dimensional grid having an x-axis and a y-axis. Pixel positions on the grid may be described by an x-axis value and a y-axis value. In some examples, the first computing device 4a may execute an object recognition algorithm that identifies a depiction of an object in the image frame 16. For example, the example binary mask 12 shown in FIG. 1 comprises a set 22 of asserted pixels at pixel positions corresponding to pixel positions of the image frame 16 that depict the object.

The first computing device 4a may compress the binary mask 12 to generate a compressed binary mask 14. The compressed binary mask 14 may be smaller than the binary mask 12. For example, the compressed binary mask 14 may include fewer bytes than the binary mask 12. The compressed binary mask 14 may be stored at the data storage device 6a of the first computing device 4a. In some examples, the compressed binary mask 14 may be stored at the data storage device 6a instead of the binary mask 12 itself. Because the compressed binary mask 14 may be smaller than the binary mask 12, this may save space at the data storage device 6a. Also, in some examples, the compressed binary mask 14 may be sent to the second computing device 4b either alone or in conjunction with the image frame 16. Again, because the compressed binary mask 14 may be smaller than the binary mask 12, sending the compressed binary mask 14 in lieu of the binary mask 12 itself may save bandwidth between the first computing device 4a and the second computing device 4b.

Figure 2:
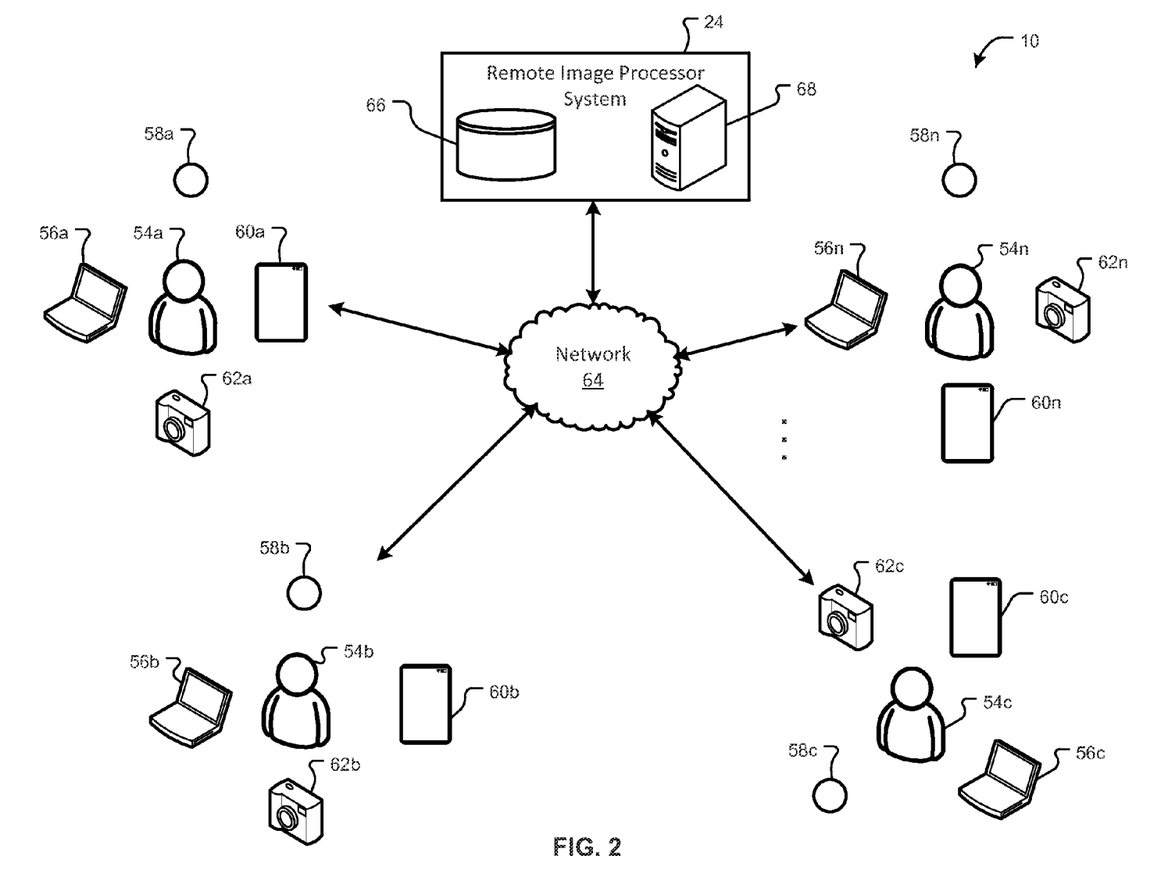
FIG. 2 is a diagram showing another example of the environment of FIG. 1 including additional components.

FIG. 2 is a diagram showing another example of the environment 10 including additional components. As shown in FIG. 2, the environment 10 comprises the remote image processor system 24 and users 54a, 54b, 54c, 54n. Each user 54a, 54b, 54c, 54n may use one or more computing devices such as, for example, panoramic cameras 58a, 58b, 58c, 58n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 2 is associated with a panoramic camera 58a, 58b, 58c, 58n, a mobile device 60a, 60b, 60c, 60n, a digital camera 62a, 62b, 62c, 62n, and a computing device 56a, 56b, 56c, 56n, some users 54a, 54b, 54c, 54n may use more, fewer, or different types of devices than what is shown. The environment 10 may also comprise a remote image processor system 24, which also comprises a computing device. The remote image processor system 24 may comprise one or more servers 68 and one or more data storage devices 66.

Computing devices may be utilized to capture image frames either for singular images or as part or all of a video. Computing devices may also perform various processing on captured image frames. In some examples, one or more computing devices may derive binary masks and/or compress binary masks, as described herein. Panoramic cameras 58a, 58b, 58c, 58n may include one or more image sensors and associated optics to capture panoramic frames (e.g., images and/or videos) as described herein. Panoramic cameras 58a, 58b, 58c, 58n may have a panoramic field-of-view larger than that of a standard camera. For example, panoramic cameras 58a, 58b, 58c, 58n may have a field-of-view of about 180° or greater. Some panoramic cameras 58a, 58b, 58c, 58n may have fields-of-view as large as 360° and/or 4π steradians, as described herein. In some examples, a panoramic camera 58a, 58b, 58c, 58n may comprise a single image sensor with lenses, mirrors or other optics allowing the single image sensor to receive electromagnetic radiation (e.g., light) from the panoramic field-of-view. In some examples, a panoramic camera 58a, 58b, 58c, 58n may comprise multiple image sensors (e.g., with overlapping fields-of-view). The panoramic camera 58a, 58b, 58c, 58n (or another component of the environment 10) may be configured to stitch frames from the respective image sensors into a single panoramic frame. In some examples, a panoramic camera 58a, 58b, 58c, 58n may be configured to communicate with other components of the environment 10 utilizing, for example, a wired or wireless connection. For example, a panoramic camera 58a, 58b, 58c, 58n may upload a frame or frames to a companion user device, such as, a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera 58a, 58b, 58c, 58n may be configured to upload frames directly to the remote image processor system 24, for example, via the network 64.

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 10 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to a remote image processor system 24, for example, via the network 64. Also, in some examples, a digital camera 62a, 62b, 62c, 62n may comprise a processor and/or other components to implement video compression, as described herein. Digital cameras 62a, 62b, 62c, 62n may have one or more than one image sensor and may have a standard or panoramic field-of-view.

A mobile device 60a, 60b, 60c, 60n may be any suitable type of computing device comprising a processor and data storage. In some examples, a mobile device 60a, 60b, 60c, 60n may be configured to receive frames captured by a panoramic camera 58a, 58b, 58c, 58n or digital camera 62a, 62b, 62c, 62n and transfer the frames to the remote image processor system 24. In some examples, a mobile device 60a, 60b, 60c, 60n may execute a remote image processor for enhancing frames and/or videos received, for example, from a panoramic camera 58a, 58b, 58c, 58n or digital camera 62a, 62b, 62c, 62n. Also, in some examples, a mobile device 60a, 60b, 60c, 60n may comprise one or more image sensors and associated optics for capturing video and either uploading the video to the remote image processor system 24 or performing compression, as described herein. In some examples, a mobile device 60a, 60b, 60c, 60n may be configured to communicate on a cellular or other telephone network in addition or instead of the network 64.

Other computing devices 56a, 56b, 56c, 56n may be any suitable type of computing device comprising a processor and data storage including, for example, a laptop computer, a desktop computer, etc. In some examples, a computing device 56a, 56b, 56c, 56n may be configured to receive image frames captured by a panoramic camera 58a, 58b, 58c, 58n or digital camera 62a, 62b, 62c, 62n and transfer the image frames to the remote image processor system 24. In some examples, a computing device 56a, 56b, 56c, 56n may be configured to execute an image processor for processing videos received, for example, from a panoramic camera 58a, 58b, 58c, 58n or digital camera 62a, 62b, 62c, 62n. Also, in some examples, a computing device 56a, 56b, 56c, 56n may comprise one or more image sensors and associated optics for capturing video and either uploading the video to the remote image processor system 24 or performing compression locally.

The remote image processor system 24 may perform various processing on image frames received from users 54a, 54b, 54c, 54n (e.g., user devices associated with the user). For example, the image processor system 24 may identify objects or other content-of-interest in frames received from users 54a, 54b, 54c, 54n. This may allow user devices, such as the panoramic cameras 58a, 58b, 58c, 58n, to turn off one or more image sensors, as described herein. In some examples, the remote image processor system 24 may perform other processing on frames received from the users 54a, 54b, 54c, 54n. For example, the remote image processor system 24 may perform various enhancements to frames received from the user devices.

The remote image processor system 24 may comprise one or more data stores 66 and one or more servers 68. The data store 66 may store panoramic frames and/or transmission frames received from the various user devices. The various components 68, 66 of the remote image processor system 24 may be at a common geographic location and/or may be distributed across multiple geographic locations. For example, the remote image processor system 24 may be implemented in whole or in part as a cloud or Software as a Service (SaaS) system. In some examples, the remote image processor system 24 may communicate with multiple different users 54a, 54b, 54c, 54n (e.g., via their associated cameras, computing devices, or other devices). The various components of the environment 10 may be in communication with one another via a network 64. The network 64 may be and/or comprise any suitable wired or wireless network configured according to any suitable architecture or protocol. In some examples, the network 64 may comprise the Internet.

Figure 3:
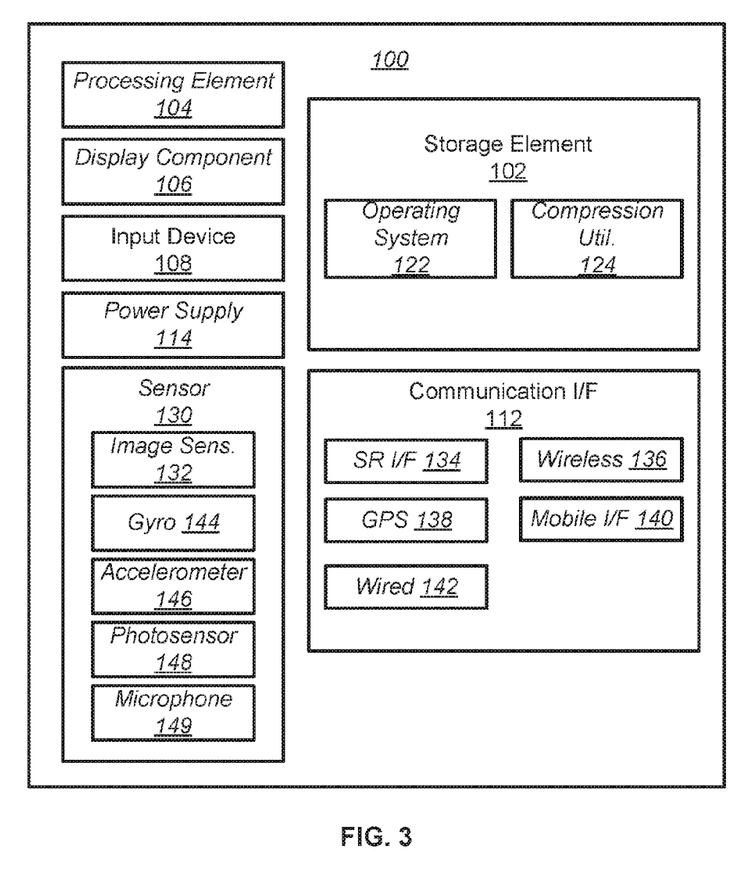
FIG. 3 is a block diagram showing an example architecture of a computing device.

FIG. 3 is a block diagram showing an example architecture 100 of a computing device. It will be appreciated that not all computing devices will include all of the components of the architecture 100 and some computing devices may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the computing device and may facilitate communications and commands between applications executing on the architecture 100 and various hardware thereof. A compression utility 124 may compress binary masks, as described herein.

When implemented in some computing devices, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processor system 24. For example, the communication interface 112 may comprise a wireless communication module 136 configured to communicate on a network, such as the network 64, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

The architecture 100 may also include one or more sensors 130 such as, for example, one or more image sensors and one or more motion sensors. Some examples of the architecture 100 may include multiple image sensors 132. Motion sensors may include any sensors that sense motion of the architecture including, for example, gyroscopes 144 and accelerometers 146. The gyroscope 144 may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 include digital compass sensors, other location sensors (e.g., utilizing beacon signals or time stamps to determine a current or past location of the architecture), time-of-flight or other depth sensors, etc. In some examples, an image sensor may also be a motion sensor. For example, frames captured by an image sensor may be analyzed to determine a direction and magnitude of the camera's motion. In some examples, the architecture may also include one or more photosensors 148 and/or one or more microphones 149. Any suitable photosensor may be used including, for example, a photodiode. Any suitable type of microphone may also be used. In some examples, photosensors 148 and/or microphones 149 may be utilized to detect content of interest, as described herein.

Figure 4:
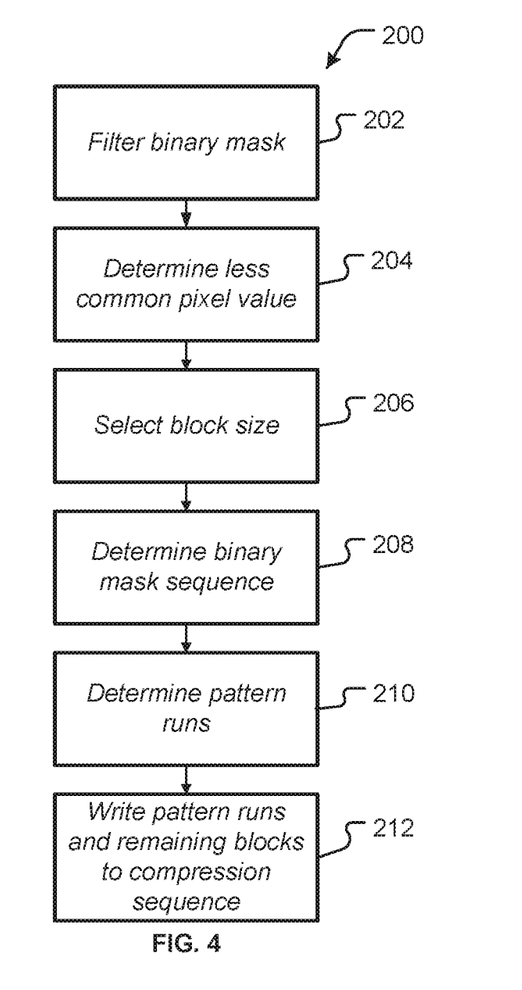
FIG. 4 is a flow chart showing one example of a process flow that may be executed by a computing device to compress a binary mask.

FIG. 4 is a flow chart showing one example of a process flow 200 that may be executed by a computing device (e.g., by a compression utility 124 executing at a computing device) to compress a binary mask. Prior to compressing a binary mask, the computing device may receive the binary mask, which is referred to herein at some places as a raw or unfiltered binary mask. For example, another computing device may send the binary mask to the computing device and/or the computing device may create the binary mask (e.g., derived from an image frame.) At 202, the computing device may filter the binary mask. For example, filtering the binary mask may comprise applying a filter to the binary mask that tends to accentuate boundaries of objects in the binary mask. In some examples, the computing device may filter the binary mask by selecting a predicted pixel value state for each pixel value position in the binary mask. The computing device may take a difference between the binary mask and the predicted pixel value states to find a filtered binary mask. In the filtered binary mask, pixel values at positions that were successfully predicted may be not asserted while pixel values at positions that were not successfully predicted may be asserted. Further examples describing the application of a filter to binary masks are provided herein with respect to FIGS. 6-9. In various examples, however, any suitable filter may be applied.

At 204, the computing device may examine the filtered binary mask to determine a frequency of the less frequent pixel value state. The less frequent pixel value state may be the pixel value state in the binary mask that occurs less often. For example, if a majority of the pixel values in the binary mask are asserted (e.g., 1), then the less frequent pixel value state may be not asserted (e.g. 0). Alternatively, if a majority of the pixel values are not asserted (e.g., 0), then the less frequent pixel value state may be asserted (e.g., 1). At 206, the computing device may select a block size for the compression. The block size may be determined based on the frequency of the less frequent pixel value state. For example, lower frequencies for the less frequent pixel value state may lead to smaller block sizes. In some examples, the block size may be an integer less than 10.

At 208, the computing device may determine a binary mask sequence for the pixel values of the binary mask. The binary mask sequence may be a linear or one-dimensional sequence of the pixel values of the binary mask. The binary mask sequence may be determined based on the spatial arrangement of the pixel values from the binary mask. For example, the binary mask sequence may be formed by placing successive rows or columns of pixel values from the spatial arrangement one after the other, although any suitable sequence may be used. In some examples, determining the binary mask sequence may comprise deriving the binary mask sequence from the spatial arrangement of the binary mask. In some examples, determining the binary mask sequence may comprise reading a binary mask sequence provided by another computing device. When the binary mask sequence is received from another computing device, a processor of the computing device may receive the binary mask sequence, either directly from the other computing device or from a memory or other data storage device, communications bus, or other component of the computing device itself. Similarly, when the computing device determines the binary mask sequence, the processor may determine the binary mask sequence and write the binary mask sequence to the memory or other data storage device. The processor may subsequently request and receive the binary mask sequence from the memory or other data storage device.

At 210, the computing device may identify runs of pixel value blocks in the binary mask sequence that exhibit a first pixel value block pattern. The first pixel value block pattern, for example, may be any suitable arrangement of the block size number of pixel values. In some examples, the first pixel value block pattern may consist of the block size number of not asserted pixel values. Each run of pixel value blocks in the binary mask sequence may be represented by a run length. At 212, the computing device may write to a compression sequence an indication of the pixel value runs of the first pattern interspersed between the remaining blocks of the binary mask sequence. In some examples, the computing device may perform further encoding on the compression sequence. In some examples, run lengths may be encoded utilizing Rice Golomb coding. Remaining blocks may be encoded utilizing Huffman coding, described in more detail below.

The process flow 200 is further illustrated with reference to the following example binary mask sequence shown at [1] below:

$$00000000000100000000011 \qquad [1]$$

In the example, the block size (n) may be equal to three and the first pixel value block pattern may be three not asserted pixel values {000}. With a block size of three, the example binary mask sequence may include five pixel value blocks, as illustrated by [2]:

$$\{000\} \{000\} \{000\} \{000\} \{100\} \{000\} \{000\} \{011\} \qquad [2]$$

The example binary mask sequence shows two runs of the first pixel block pattern {000} including a run of four blocks at positions 1-4 of the sequence and a run of two blocks at positions 6-7 of the sequence. Accordingly, as described at 212, the compression sequence may be as indicated by [3].

$$4, \{100\} 2, \{011\} \qquad [3]$$

At [3], the two runs are replaced by indications of the run length.

In various examples, the computing device may further encode the compression sequence. For example, the run lengths (e.g., 4, 2 in the example above) may be further encoded utilizing Rice Golomb coding. A Rice Golomb parameter m, in some examples, may be related to the block size as indicated by [4] below:

$$m=8-n(\text{for } n<7) \qquad [4]$$

Accordingly, in the example above, m may be equal to 5. To find a Rice Golomb coding, then, the computing device may divide the run length by m. The quotient may be written to the compression sequence in unary notation. The remainder or modulus may be written to the compression sequence in binary. For example, the run length 4 may be expressed as a unary quotient of 4/m, which equals one (1), and a remainder, which also equals one (1), as given by [5]:

$$1\ 01 \qquad [5]$$

Accordingly, in various examples, the compression sequence for the example above may be written as given by [6]:

$$1\ 01, \{100\}, 0\ 10, \{011\} \qquad [6]$$

In some examples, the computing device may further encode the remaining blocks (e.g., blocks not showing the first pattern) utilizing Huffman coding. In some examples, the computing device may implement the Huffman coding with an assumption set given by TABLE 1 below:

TABLE 1

Huffman Code Probability Distribution

It is equally probable that any given pixel value is asserted
It is equally probable that any two consecutive pixel values are asserted, and less probable that any one pixel value is asserted.
It is equally probable that any three consecutive pixel values are asserted, and less probable that any two consecutive pixel values are asserted.

An example variable length coding (VLC) table for Huffman coding under the assumptions of TABLE 1 is given by TABLE 2 below:

TABLE 2

| Input Bit | VLC Code | Bit Length of VLC Code |
|---|---|---|
| 000 | 11110 | 5 |
| 001 | 00 | 2 |
| 010 | 01 | 2 |
| 011 | 1100 | 4 |
| 100 | 10 | 2 |
| 101 | 1101 | 4 |
| 110 | 1110 | 4 |
| 111 | 11111 | 5 |

Accordingly, in some example, the compression sequence may be given by [7] below:

$$1\ 01, 10, 0\ 10, 1100 \qquad [6]$$

Figure 5:
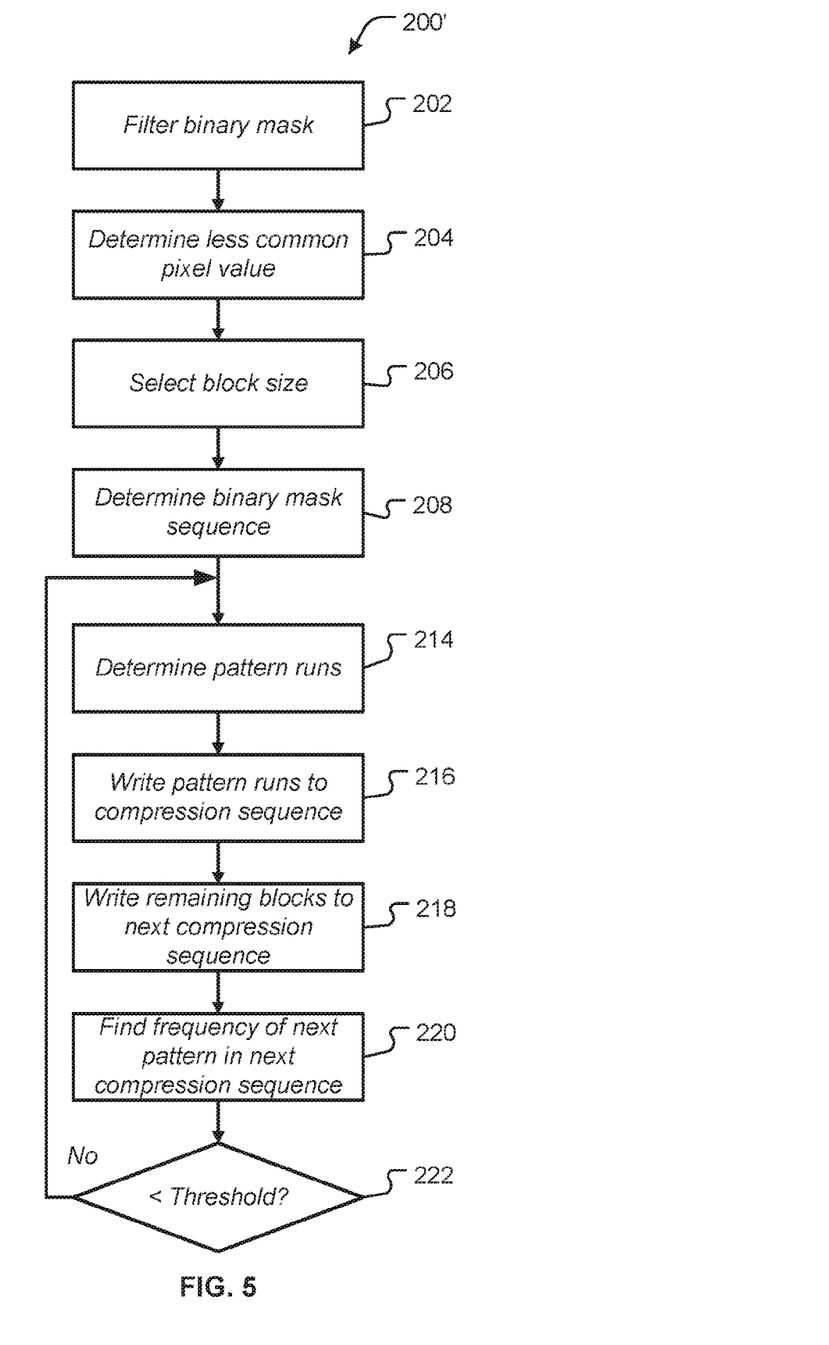
FIG. 5 is a flow chart showing another example of a process flow that may be executed by a computing device to compress a binary mask.

FIG. 5 is a flow chart showing another example of a process flow 200' that may be executed by a computing device to compress a binary mask. Actions 202, 204, 206 and 208 of the process flow 200' may be similar to the similarly numbered actions of the process flow 200 above. At 214, the computing device may determine pattern runs for the first pattern, similar to action 212 described above. At 216, the computing device may write pattern runs to a first compression sequence. For example, referring to the example binary mask sequence at [1] above, the first compression sequence may be given as follows at [7]:

$$4, 2 \qquad [7]$$

In some examples, the first compression sequence may be further encoded utilizing Rice Golomb encoding as described herein above. At 218, the computing device may generate a second compression sequence comprising the remaining blocks to a second compression sequence. Generating the second compression sequence may comprise creating a new compression sequence and writing the remaining blocks to the new compression sequence. In some examples, generating the second compression sequence may comprise removing from the binary mask sequence the pattern runs identified at 214. Accordingly, the modified binary mask sequence may be the second compression sequence. In some examples, the second compression sequence may be given by [8] below:

$$\{100\} \{011\} \quad [8]$$

The second compression sequence may be further encoded, for example, utilizing Huffman coding as described above. At 220, the computing device may determine a frequency of a next pattern of pixel value blocks. The next pattern of pixel value blocks may be selected in any suitable manner. In some examples, the computing device may select the least frequent pixel value block pattern remaining in the binary mask. Also, in some examples, the computing device may utilize a progression of patterns that is determined at the outset of the compression. If, at 222, the frequency of the next pixel value block is below a threshold frequency, then the computing device may end the compression. If the frequency of the next pixel value block is not below the threshold frequency, the computing device may return to action 214 and find runs of the next pattern of pixel value blocks in the second compression sequence. Run lengths for the identified runs of the next pattern of pixel value blocks may be written to the first compression sequence and/or to an additional pixel value sequence. Pixel value blocks from the runs of the next pixel value may be deleted from the second compression sequence, leaving the remaining pixel value blocks that include neither the first pattern nor the second pattern. Alternatively, the remaining pixel value blocks may be written to an additional pixel value sequence. In some examples, compression sequences generated in this manner may be appended to form a single compression sequence. The compression sequences may be appended in any suitable manner. For example, the first compression sequence including pattern runs may be positioned first with the second compression sequence including remaining blocks appended thereafter. The order may also be reversed. Also, in examples where the computing device generates multiple compression sequences including pattern runs, these sequences may be appended in any suitable order to form the single compression sequence.

Figure 6:
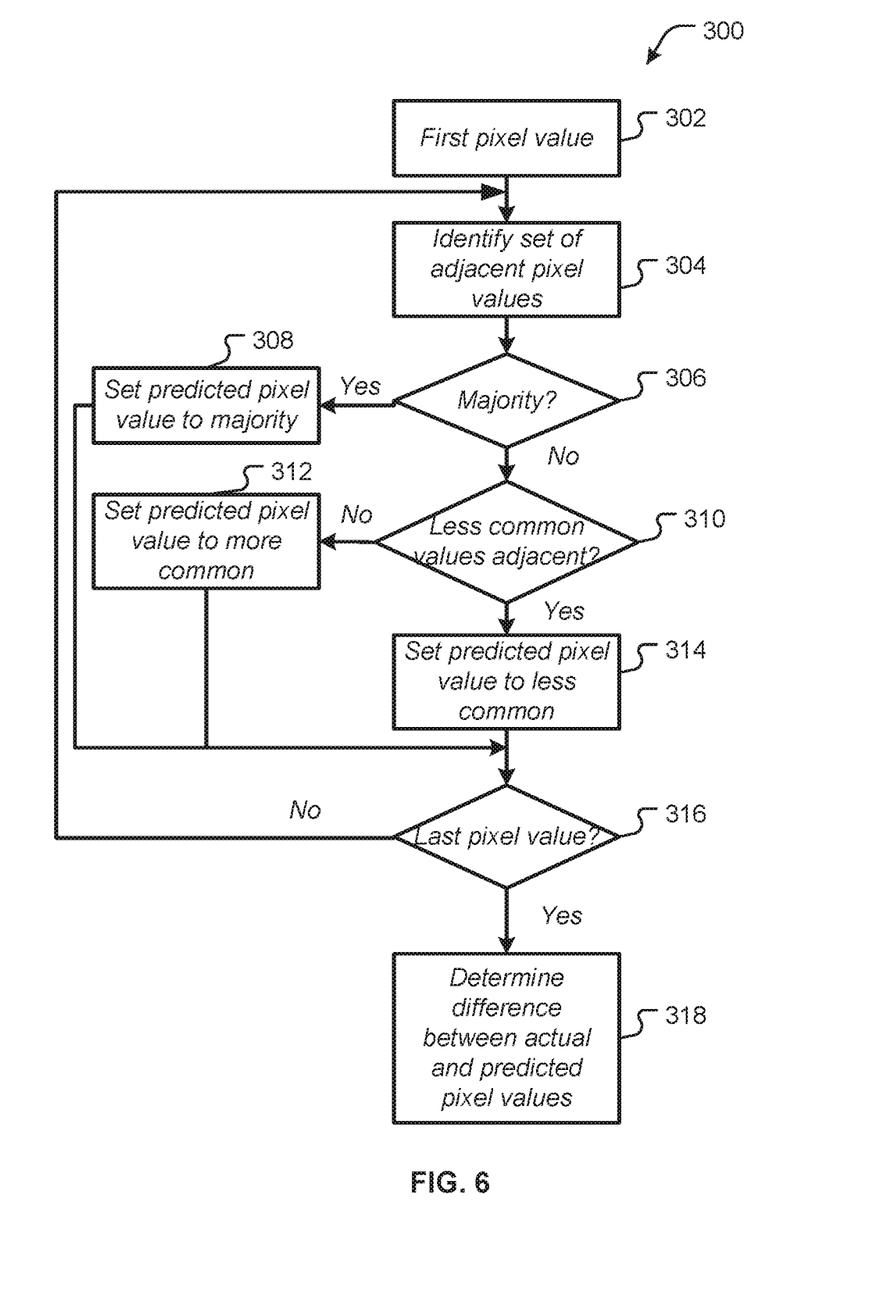
FIG. 6 is a flow chart showing one example of a process flow that may be executed by the computing device to apply a filter to a binary mask.

FIG. 6 is a flow chart showing one example of a process flow 300 that may be executed by the computing device to apply a filter to a binary mask, for example, as described above with respect to action 202. At 302, the computing device may identify a first pixel value from the binary mask. For example, the first pixel value may be any suitable pixel value at any suitable pixel position in the binary mask. In some examples, the first pixel value may be at the upper left of the binary mask. At 304, 306, 308, 312, 310 and/or 314, the computing device may generate predicted pixel values for each pixel value position in the binary mask. An example equation for finding the predicted states is given by [9] below:

$$f(P(x-1,y), P(x-1,y-1), P(x,y-1), P(x+1,y-1)) \quad [9]$$

Figure 7:
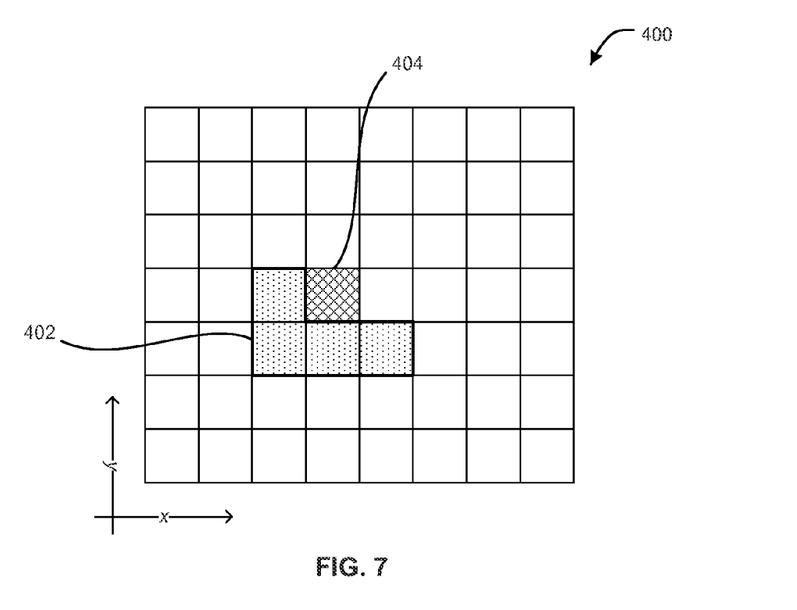
FIG. 7 is a diagram showing one example of a set of pixel values that may be used to generate a predicted pixel value for a subject pixel value.

For example, the predicted state for a pixel value may be a function of a set of pixel values adjacent to the pixel value according to the spatial arrangement of the binary mask. Any suitable number and selection of adjacent pixel values may be used. FIG. 7 is a diagram 400 showing one example of a set of pixel values 402 that may be used to generate a predicted pixel value for a subject pixel value 404. In the example illustrated by FIG. 7 and [9] above, the set of pixel values may include: (i) a pixel value one pixel value position to the left of the subject pixel value (x−1, y); (ii) a pixel value one pixel value position to the left and one pixel value position down from the subject pixel value position (x−1, y−1); (iii) a pixel value that is one pixel value position down from the subject pixel value position (x, y−1); and (iv) a pixel value that is one pixel value position to the right and one pixel value position down from the subject pixel value (x+1, y−1).

At 306, the computing device may determine whether a majority of the pixel values in the pixel value set have a common state (e.g., asserted or not asserted). If yes, then the computing device may, at 308, set the predicted state for the subject pixel value to the common state of the majority of the set. If there is no majority of pixel values having a common state (e.g., the pixel values are equally split), then the computing device may determine, at 310, whether any adjacent pixel values in the set have the less frequent pixel value state. If not, then the predicted pixel value for the subject pixel value may be set to the more frequent value at 312. If so, then the predicted pixel value for the subject pixel value may be set to the less frequent value at 314. At 316, the computing device may determine whether there are any remaining pixel values in the binary mask for which no prediction has yet been made. If so, then the computing device may consider the next pixel value and return to 304. If predictions have been made for all pixel values in the binary mask, then the computing device may, at 318, determine a difference between the actual and predicted states for the pixel values of the binary mask. This difference may be the filtered binary mask.

Figure 8:
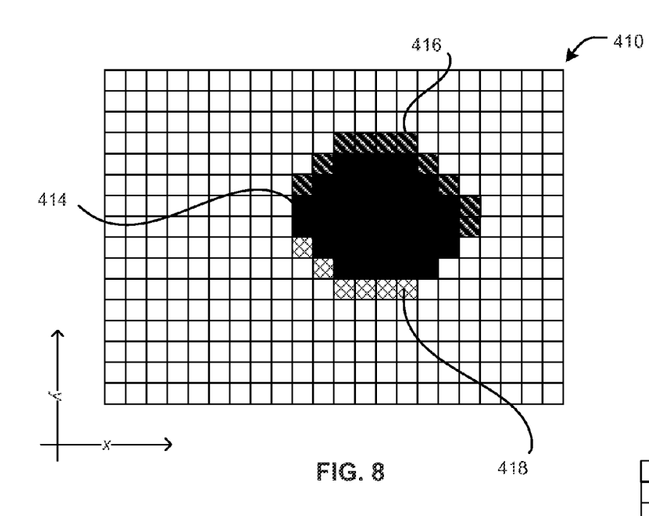
FIGS. 8 and 9 show an example binary mask illustrating the filtering described at FIGS. 6 and 7.
Figure 9:
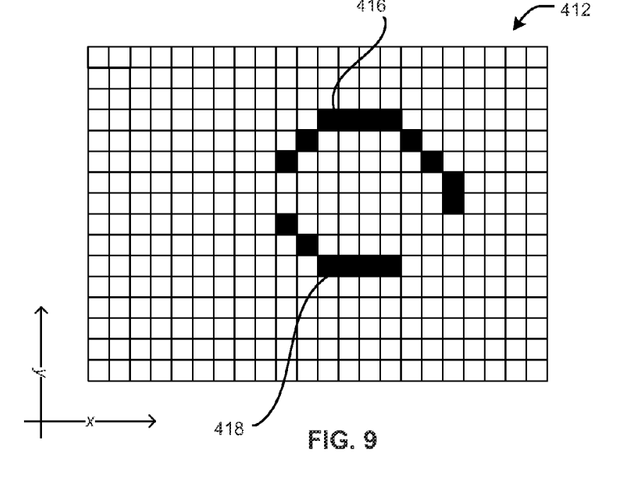

FIGS. 8 and 9 show an example binary mask illustrating the filtering described at FIGS. 6 and 7. FIG. 8 shows a frame 410 comprising predicted pixel values for the binary mask 12 (FIG. 1). In the example of FIGS. 8-9, the most common pixel value is asserted—indicated by solid black, and the less frequent pixel value state is not asserted—indicated by white. Region 414 includes pixel values that were asserted in the binary mask 12 of FIG. 1 and are also predicted to be asserted by the process flow 300. Region 416 includes pixel values that were not asserted in the binary mask 12 but were predicted to be asserted by the process flow 300. Region 418 includes pixels values that were asserted in the binary mask 12 but were not predicted to be asserted by the process flow 300. FIG. 9 shows a filtered binary mask 412 corresponding to the binary mask 12 of FIG. 1. As illustrated, pixel values in the incorrectly predicted regions 416 and 418 are asserted, while correctly predicted pixel values are not asserted.

Figure 10:
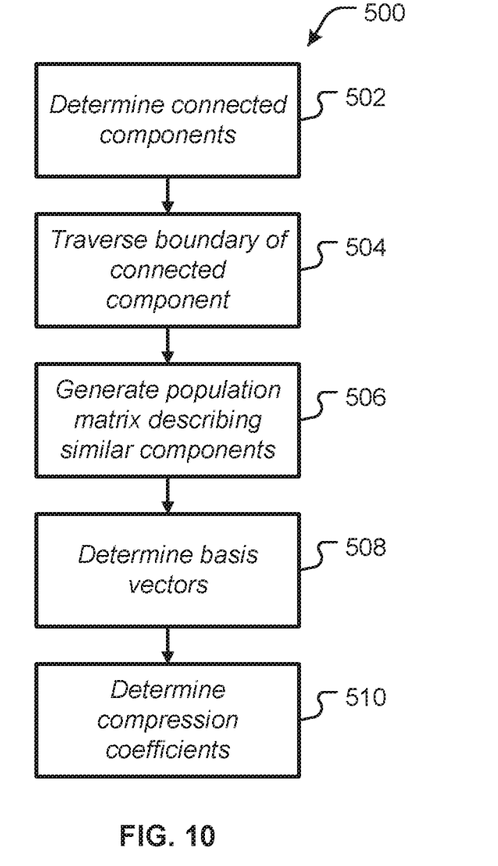
FIG. 10 is a flowchart showing one example of a process flow that may be executed by a computing device to implement a lossy compression of a binary mask.

FIG. 10 is a flowchart showing one example of a process flow 500 that may be executed by a computing device to implement a lossy compression of a binary mask. The examples described herein with respect to FIGS. 1-9 may enable a complete reconstruction of the original binary mask. The process flow 500 may enable an estimate of the original binary mask, which may be sufficient in some circumstances. At 502, the computing device may determine connected components in the binary mask. Connected components may be pixel values at adjacent pixel value positions that have a common state. For example, connected components may be pixel values at adjacent pixel value positions that have the less frequent pixel value state. Referring to FIG. 1, the set 22 of asserted pixels may be a connected component. Connected components may be found in any suitable manner. In some examples, connected components may be determined utilizing a graph traversal algorithm. If there is more than one connected component in a binary mask, in some examples, each connected component may be considered separately.

At 504, the computing device may traverse and characterize a boundary of a first connected component. For example, the computing device may select a pixel value position starting point, referred to herein as P. In some examples, P may be the highest point on the connected component (e.g., the pixel position having the highest value on the y-axis). The computing device may traverse the boundary with constant speed generating points $(x_t, y_t)$ on the boundary at times t until the computing device completes a cycle of the connected component and arrives again at the staring point P. The result of the traversing at 504 may include a graph of time that represents the movement along the boundary of the connected components. Optionally, the computing device may sample a specified number of points from the graph of time. For example, connected components depicting the same thing in a scene may appear at different sizes in different frames. Accordingly, the boundary length for equivalent connected components might not be the same. To treat equivalent connected components efficiently, the computing device may sample from the graph of time a specified number of points $(x_j, y_j)$ for example 128. This number will provide a trade-off between the quality of the compression and processing speed. The points for a connected object may be represented as a sampled test vector v given by [10]:

$$v = (z_1, \ldots, z_{128}) \quad [10]$$

In some examples, different number of points can be chosen for the boundary description. The test vector may have a fixed length M equal to the number of samples from the time graph. Each coordinate $z_j$ in the test vector v may be a complex number given by [11]:

$$z_j = x_j + i y_j \quad [11]$$

At 506, the computing device may generate a population matrix comprising test vectors v from training connected components, including the test vector generated at 504. For example, the computing device may repeat action 504 for multiple connected components to generate the population matrix. In some examples, K training connected components may be used and test vectors v in the population matrix may be represented by [12] below:

$$v_i = (z_1^i, \ldots, z_{128}^i) \quad [12]$$

One example of the population matrix may be represented by [13] below:

$$A = (v_1^T, \ldots, v_K^T) \quad [13]$$

The population matrix A may represent the underlying distribution of given class (e.g., a distribution of similar connected components). For example, connected components described by the population matrix A may depict a common thing such as, for example, a walking person, a face, a car, etc.

At 508, the computing device may determine basis vectors for the binary mask. For example, the computing device may determine a Single Value Decomposition (SVD) of the population matrix to generate [14] below:

$$A = USV^T \quad [14]$$

In [14], U may represent basis vectors for decomposing the test vectors. Using the first N basis vectors from U, the computing device, at 510, may obtain N coefficients by scalar product of a given test vector with each of the N vectors, as given by [15] below:

$$a_i = \langle f | U_i \rangle \quad [15]$$

The N coefficients, represented by $a_i$ in [15] may comprise the compressed version of the binary mask. In some examples, the coefficients may be represented in the memory of the computing device by 32 bit floating point numbers. In some examples of the process flow 500, the N coefficients may also be used to identify the class of described objects. For example, a class of objects that are humans may be identified by N coefficients, while a class of objects that are pets may be identified by different N coefficients.

In some examples, the coefficients may be decoded to produce the original binary mask as given by [16] below:

$$\hat{f} = \sum_{i=1}^{N} a_i U_i \quad [16]$$

In 16, $\hat{f}$ represents the boundary of a connected component. The computing device may reconstruct the binary mask from one or more boundaries, for example, utilizing a flood fill algorithm.

Various examples of the process flow 500 may utilize alternative techniques for deriving the test vectors v in lieu of traversing the boundary of a connected component as described above at 504. In some examples, the computing device may traverse the boundary of a connected component and find a curvature of the boundary curve at different positions on the boundary. Instead of utilizing a test vector made up of points $(x_j, y_j)$, the test vector in this example may be made up of a series of curvature values around the boundary. In another example, the computing device may select a center of mass of a connected component and determine a plurality of rays from the center of mass to positions on the boundary of the connected component. The rays may be spaced, for example, at fixed angles around the center of mass (e.g., $2\pi/128$). The test vector in this example may be made up of the rays. In some examples, if a connected component is convex, the intersection of the rays with the boundary is a single value function. In the case that the connected component is not convex, then rays may be drawn to the outer limit of the binary mask.

Various examples of the process flow 500 may utilize alternative techniques to determine the basis vectors at 508. For example, instead of determining an SVD of the population matrix, the computing device may find a fast Fourier transform (FFT) that has predefined basis functions. Because the basis functions of an FFT transform may be predefined, it may not be necessary to include the basis functions in the compressed binary mask, which may lead to an improved compression ratio.

In some examples, the number of basis sets (e.g., sets of basis vectors) may be modified to improve the efficacy of compression. For example, in the case that we would like to distinguish between different objects that can move in the house (for example in security camera case), such as people or pets, the computing device may generate separate sets of basis vectors, one for each category of expected object. Then applying an appropriate basis to a given object may result in more efficient description of the object, which may lead to the significant improvement in the compression results.

In some examples, the process flow 500 may enable the computing device to ignore large portions of the binary mask. For example, any portion of the binary mask that is not a connected component may be disregarded during the process of boundary description generation. For example, there may be occlusions or shadows present in the binary mask, leading to areas that do not describe the object reliably. In those cases some boundary regions might not be taken into consideration, and inner product that we use for calculating the coefficients can be performed excluding those points. This may also simplify the reconstruction of areas in the binary mask that might have been missing during the mask generation or the process of boundary extraction.

Some examples of the process flow 500 executed on some binary masks may result in high errors. If the error is for a particular binary mask and/or connected component, the computing device may re-run the compression with another set of basis vectors corresponding to another connected component type. Also, in some examples, the computing device may increase the number of points used for basis vectors. Additionally, in some examples, the computing device may contact a remote image processor system, such as 24 in FIG. 2, and request that the basis vectors for one or more object types be re-calculated.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method of compressing a binary mask in a computing device comprising a processor and a data storage device in communication with the processor, the method comprising:
receiving, by a computing device, a binary mask;
determining that the binary mask comprises a plurality of pixel values and spatial data describing a spatial arrangement of the plurality of pixel values on a two-dimensional grid described by an x-axis and a y-axis;
determining, by the computing device, for a first pixel value of the plurality of pixel values at a first pixel position on the two-dimensional grid, a first predicted pixel value based at least in part on a set of pixel values of the plurality of pixel values that are adjacent to first pixel value according to the spatial arrangement of the plurality of pixel values;
generating, by the computing device, a predicted binary mask comprising a second plurality of pixel values and second spatial data describing a spatial arrangement of the second plurality of pixel values on the two-dimensional grid, wherein the second plurality of pixel values comprises the first predicted pixel value and wherein the second spatial data describes the first predicted pixel value at the first pixel position on the two-dimensional grid;
determining, by the computing device, a difference between the binary mask and the predicted binary mask, wherein the difference is a filtered binary mask comprising a third plurality of pixel values and third spatial data describing a third spatial arrangement of the third plurality of pixel values on the two-dimensional grid;
determining, by the computing device, a first sequence of the third plurality of pixel values that comprise a plurality of rows from the third spatial arrangement ordered according to a positioning of the plurality of rows on the y-axis;

determining, by the computing device, that a frequency of asserted pixel values in the third plurality of pixel values is less than a threshold frequency;

selecting, by the computing device, a pixel value block size associated with the threshold frequency;

determining, by the computing device, a first run length number of pixel value blocks of the pixel value block size in the first sequence that include only not asserted pixel values;

writing, by the computing device, the first run length number to a first compression sequence; and writing, by the computing device, to a second compression sequence a pixel value block positioned in the first sequence after the first run length number in the first sequence;

determining, by the computing device, that a frequency of pixel value blocks in the second compression sequence having a first pattern of asserted pixel values is greater than a block frequency threshold;

determining, by the computing device, a second run length number of pixel values blocks in the second compression sequence having the first pattern of asserted pixel values; and writing, by the computing device, the second run length number to the first compression sequence.

2. The method of claim 1, further comprising:

determining, by the computing device, that a second frequency of second pixel value blocks in the second compression sequence having a first pattern of asserted pixel values is not greater than a block frequency threshold; and encoding the first compression sequence and the second compression sequence.

3. The method of claim 1, wherein determining the first predicted pixel value comprises:

identifying the set of pixel values, wherein the set of pixel values consists of four pixel values;

determining that the set of pixel values comprises more than two asserted pixel values; and determining that the first predicted pixel value is asserted.

4. A computing device for compressing a binary mask, the computing device comprising:

at least one processor; and a data storage device in communication with the at least one processor, wherein the data storage device comprises instructions stored thereon that, when executed by the at least one processor, cause the at least one processor to:

receive a binary mask;

determine that the binary mask comprises a plurality of pixel values and first spatial data describing a two-dimensional arrangement of the pixel values;

receive a binary mask sequence of the plurality of pixel values based at least in part on the two-dimensional arrangement of the pixel values;

determine that a frequency of a less frequent pixel value state of the binary mask is less than a threshold frequency;

determine a first run length number of pixel value blocks of a block size that are positioned consecutively in the binary mask sequence and that comprise a first pattern of pixel values;

store the first run length number to a first compression sequence;

generate a second compression sequence comprising a pixel value block positioned in the first sequence after the first run length number; and determine a second run length number of pixel value blocks in the second compression sequence that are positioned consecutively in the second compression sequence that comprise a second pattern of pixel values.

5. The computing device of claim 4, wherein the data storage device further comprises instructions stored thereon that, when executed by the at least one processor, cause the at least one processor to select the block size based at least in part on the frequency of the less frequent pixel value state of the binary mask.

6. The computing device of claim 4, wherein the data storage device further comprises instructions stored thereon that, when executed by the at least one processor, cause the at least one processor to generate the second compression sequence to comprise a plurality of pixel value blocks that do not comprise the first pattern of pixel values.

7. The computing device of claim 6, wherein the data storage device further comprises instructions stored thereon that, when executed by the at least one processor, cause the at least one processor to determine that a frequency, at the second compression sequence, of pixel value blocks comprising a second pattern of pixel values is less than a threshold frequency.

8. The computing device of claim 6, wherein the data storage device further comprises instructions stored thereon that, when executed by the at least one processor, cause the at least one processor to, before determining the second run length number of pixel value blocks in the second compression sequence, determine that a frequency, at second compression sequence, of pixel value blocks comprising a second pattern of pixel values is greater than a threshold frequency.

9. The computing device of claim 8, wherein the data storage device further comprises instructions stored thereon that, when executed by the at least one processor, cause the at least one processor to:

write the second run length number of pixel value blocks to the first compression sequence; and delete, from the second compression sequence, pixel value blocks from the second run length number of pixel value blocks.

10. The computing device of claim 4, wherein the data storage device further comprises instructions stored thereon that, when executed by the at least one processor, cause the at least one processor to:

receive an unfiltered binary mask comprising a second plurality of pixel values and second spatial data describing a two-dimensional arrangement of the second plurality of pixel values; and generate the binary mask based at least in part on the unfiltered binary mask.

11. The computing device of claim 4, wherein the data storage device further comprises instructions stored thereon that, when executed by the at least one processor, cause the at least one processor to:

receive an unfiltered binary mask comprising a second plurality of pixel values and second spatial data describing a two-dimensional arrangement of the second plurality of pixel values;

for a first pixel value selected from the second plurality of pixel values identify a first set of pixel values having pixel value positions adjacent the first pixel value; and determine a predicted state for the first pixel value based at least in part on the first set of pixel values.

12. The computing device of claim 11, wherein the data storage device further comprises instructions stored thereon that, when executed by the at least one processor, cause the at least one processor to:
  determine that a majority of the first set of pixel values are of a common state, wherein the common state is either asserted or not asserted; and
  determine that the predicted state for the first pixel value is the common state.

13. The computing device of claim 11, wherein the data storage device further comprises instructions stored thereon that, when executed by the at least one processor, cause the at least one processor to:
  determine that half of the first set of pixel values are the less frequent pixel value state;
  determine that a threshold number of the half of the first set of pixel values that are the less frequent pixel value state are adjacent in the two-dimensional arrangement of the second plurality of pixel values; and
  determine that the predicted state for the first pixel value is the less frequent pixel value state.

14. The computing device of claim 4, wherein the data storage device further comprises instructions stored thereon that, when executed by the at least one processor, cause the at least one processor to:
  determine a first encoding parameter based at least in part on the block size;
  divide the first run length number by the first encoding parameter to find a quotient and a modulus;
  determine a unary representation of the quotient; and
  determine a binary representation of the modulus, wherein writing the first run length number to the first compression sequence comprises writing to the first compression sequence the unary representation of the quotient and the binary representation of the modulus.

15. The computing device of claim 4, wherein the first pattern of pixel values consists of the block size number of pixels with the less frequent pixel value state.

16. A method for compressing a binary mask by a computing device, comprising:
  receiving a binary mask comprising a plurality of pixel values and first spatial data describing a two-dimensional arrangement of the pixel values;
  receiving a binary mask sequence of the plurality of pixel values based at least in part on the two-dimensional arrangement of the pixel values;
  determining that a frequency of a less frequent pixel value state of the binary mask is less than a threshold frequency;
  selecting a block size corresponding to the threshold frequency;
  determining a first run length number of pixel value blocks of the block size that are positioned consecutively in the binary mask sequence and that comprise a first pattern of pixel values; and
  storing the first run length number to a first compression sequence.

17. The method of claim 16, further comprising generating a second compression sequence comprising a plurality of pixel value blocks from the binary mask sequence that do not comprise the first pattern of pixel values.

18. The method of claim 17, further comprising determining that a frequency, at the second compression sequence, of pixel value blocks comprising a second pattern of pixel values is less than a threshold frequency.

19. The method of claim 17, further comprising:
  determining that a frequency, at the second compression sequence, of pixel value blocks comprising a second pattern of pixel values is greater than a threshold frequency; and
  determining a second run length number of pixel value blocks that are positioned consecutively in the second compression sequence that comprise the second pattern of pixel values.

20. The method of claim 16, further comprising:
  receiving an unfiltered binary mask comprising a second plurality of pixel values and second spatial data describing a two-dimensional arrangement of the second plurality of pixel values; and
  filtering the unfiltered binary mask to generate the binary mask.

* * * * *